United States Patent Office 3,459,789
Patented Aug. 5, 1969

3,459,789
URETHANE METHYLOL ETHERS CONTAINING HYDROXYL GROUPS
Erwin Müller and Dieter Dieterich, Leverkusen, Germany, assignors to Farbenfabriken Bayer Aktiengesellschaft, Leverkusen, Germany, a corporation of Germany
No Drawing. Filed Apr. 19, 1966, Ser. No. 543,528
Claims priority, application Germany, May 3, 1965, F 45,948
Int. Cl. C07c 101/26, 101/30; D06m 13/40
U.S. Cl. 260—482    3 Claims

ABSTRACT OF THE DISCLOSURE

Compounds of the formula:

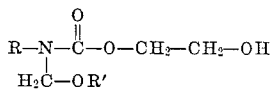

wherein R is hydrogen, alkyl of 1 to 18 carbon atoms, alkenyl of 1 to 18 carbon atoms or

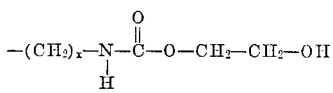

wherein $x$ is 0 to 6 and R' is alkyl having 1 to 12 carbon atoms, process of producing the same and their utility in the production of polyurethane resins, as auxiliary agents for paper and textiles and as age resistors and stabilizers for resins including polyoxymethylenes.

---

The invention relates to urethane methylol ethers containing free hydroxyl groups and more particularly to a process of preparing the same.

It is known to prepare alkyl methylol ethers of urethanes (carbamic acid esters) by reacting the corresponding methylol compounds with monofunctional alcohols. However, the production of methylol ethers of urethanes (=carbamic acid esters) which also contain free aliphatic hydroxyl groups is not known since, as is well known, N-methylol ethers react with aliphatic hydroxyl groups, especially in the acid pH region and at elevated temperature also in the neutral and alkaline region, to split off the alcohol on which the methylol ether group is based and form a new ether. This etherification takes place particularly readily if the methylol ether group can react with the hydroxyl group to undergo ring closure. Under this condition, ring closure will even take place under the usual etherification conditions used for the preparation of N-methylol ether.

A process for the preparation of N-methylol ether derivatives has now been found which is characterised in that compounds which contain the following group

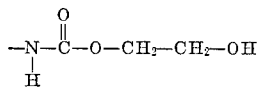

at least once are reacted with formaldehyde at pH above 7 and then etherified with monohydric alcohols at pH values below 7.

The process may, for example, be used for the preparation of N-methylolethers of carbamic acid β-hydroxyethyl ester derivatives which carry a saturated or unsaturated aliphatic hydrocarbon radical or a hydrogen atom on the nitrogen or which are linked to another chemically similar carbamic acid β-hydroxyethylester radical directly through the nitrogen or through an alkylene radical, by reacting the carbamic acid β-hydroxyethyl esters with formaldehyde at pH values above 7 and etherifying the resulting product with a monohydric aliphatic alcohol at a pH below 7.

Of special interest are methylolester derivatives obtained by reacting carbamic acid β-hydroxyethyl esters of the following formula

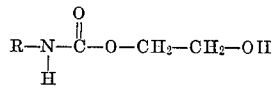

in which R represents a hydorgen atom or a linear or branched alkyl radical having 1 to 18, preferably 1 to 6 carbon atoms, a linear or branched alkenyl radical having 1 to 18, preferably 1 to 6 carbon atoms, or the group

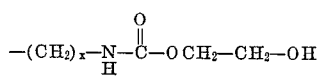

($x$=integer between 1 and 6) or the group

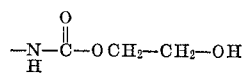

with formaldehyde at pH values above 7 and by etherifying at pH values below 7 with alcohols of the formula

wherein R' is a linear or branched alkyl radical with 1–12, preferably 1 to 4, carbon atoms.

The methylol ether derivatives obtained correspond to the following formula

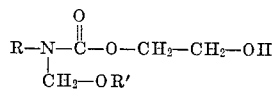

in which R and R' have the meaning indicated above.

It was surprising that the methylol ethers prepared by the process according to the invention were obtained in such excellent yields since it was to be expected that under the conditions of etherification, the β-hydroxy group would react with the etherified methylol group to split off alcohol and form a 7-membered ring.

The process according to the invention may be carried out by reacting carbamic acid β-hydroxyethyl derivatives, which are obtained by known methods from glycol carbonate and ammonia or aliphatic primary mono- or diamines, with aqueous formaldehyde at pH values above 7, preferably at pH values of 8 to 9, at room temperature or temperatures up to 100° C. preferably 20 to 80° C., to form the corresponding methylol compounds. The water is then distilled off, preferably in a vacuum, and the methylol derivatives obtained are dissolved in an excess of a monohydric aliphatic alcohol, adjusted to a pH below 7, preferably 1 to 2, with a strong acid and etherified at room temperature or temperatures of up to 100° C., preferably 20 to 80° C. After the reaction, the pH of the reaction mixture is adjusted to 7 to 10, preferably 7 to 9, the alcohol is distilled off and the end product is filtered. It is sometimes advantageous to filter off the end product from the alcoholic solution.

Monohydric aliphatic alcohols with 1 to 18 carbon atoms, such as methanol, ethanol, n-propanol, isopropanol, n-butanol, sec.-butanol, tertiary butanol, n-pentanol and the isomeric pentanols, hexanol, octanol; decanol, dodecanol or stearyl alcohol may be used for etherifying the methylol compounds.

Monohydric aliphatic alcohols with 1 to 4 carbon atoms, such as methanol, ethanol, n-propanol, isopropanol, n-butanol, sec.-butanol and tertiary butanol are of particular interest for this purpose.

In order to adjust the pH of the reaction mixture to above 7 when converting the β-hydroxyethyl derivative to the methylol compound and isolation, alkalis such as soda, potash, sodium bicarbonate, aqueous sodium hydroxide or potassium hydroxide are used, of which soda and potash are preferred.

For adjusting the pH of the reaction mixture to below 7, in the etherification of the methylol derivatives, strong acids are used such as hydrochloric acid, hydrobromic acid, nitric acid, sulphuric acid, phosphoric acid, fluoroboric acid, oxalic acid, trichloroacetic acid and organic sulphonic acids such as p-toluene sulphonic acid, of which acids hydrochloric acid and sulphuric acid are preferred.

The products obtained by the process of the invention can be used for the production of cross-linked polyurethane resins, as auxiliary agents in the production of paper for increasing the wet strength, for the production of paper sizing agents, as auxiliary agents for textiles and as age-resistors and stabilisers for synthetic resins such as polyoxymethylenes.

Example 1

3.6 mols=360 g. of a 30% Formalin solution the pH of which has previously been adjusted to 8 to 9 with soda are added to 3.6 mols=380 g. of carbamic acid β-hydroxyethyl ester (B.P. 125 to 138° C./0.1 mm. Hg). The mixture is then heated to 70° C. for 20 minutes and concentrated by evaporation in a water jet vacuum at 12 mm. Hg and the residue is then introduced into 1000 cc. of methanol the pH of which has previously been adjusted to about 2 with a few drops of conc. hydrochloric acid (about 0.5 cc.). Etherification is completed after ½ hour at 40° C. Sufficient sodium carbonate solution is added to bring the pH to 7 to 8, the methanol is evaporated off in vacuo and the residue is filtered through a steam suction filter. After distillation at B.P. 142 to 150° C./0.8 mm. Hg, 395 g.=74% of the theoretical amount of N-methylol-methyl ether-carbamic acid-β-hydroxyethyl ester (β-hydroxyethyl-urethane-N-methylol methyl ether) are obtained.

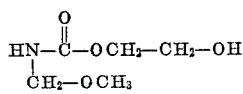

Analysis calculated for $C_5H_{11}O_4N$: molecular weight 149. Calculated: C, 40.2%; H, 7.2%; O, 43.0%; N, 9.4%. Found: C, 40.27%; H, 7.4%; O, 42.87%; N, 9.2%. Molecular weight (determined in methanol) 160.

By reacting it with formaldehyde, β-hydroxyethyl urethane-N-methylolmethyl ether can be converted into methylene - bis - (β-hydroxy-ethyl-urethane-N-methylolmethyl ether).

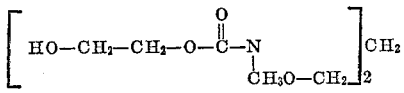

Example 2

500 cc. water, 100 g. 30% Formalin solution (1 mol) and 3 cc. conc. hydrochloric acid are added to 210 g. β-hydroxyethyl urethane (2 mols) and the reaction mixture is left to stand at room temperature for 3 days. The resulting condensation product is methylene-bis-(β-hydroxyethyl urethane). [Methylene-bis-(carbamic acid-β-hydroxyethyl ester)]

HO—H₂C—H₂C.OOC—HN—CH₂—NH—
COO—CH₂—CH₂—OH

Without isolating this product, the pH of the aqueous solution is adjusted to pH 8 to 9 by the addition of soda, and a further 2.2 mols=220 g. of Formalin solution (30%) are added. The mixture is heated for 20 minutes at 70° C. and concentrated by evaporation in vacuo, and 1000 cc. of methanol previously brought to pH 2 with a few drops of conc. hydrochloric acid are added to the residue. One then follows the proceeds as indicated in Example 1 and 224 g. (72% of theoretical) of methylene - bis - (β - hydroxyethyl urethane - N - methylolmethyl ether) are obtained.

Analysis calculated for $C_{11}H_{22}N_2O_8$: molecular weight 310. Calculated: C, 42.6%; H, 7.1%; O, 41.3%; N, 9.0%. Found: C, 41.2%; H, 7,28%; O, 41.2%; N, 9.2%. Molecular weight (determined in methanol) 330.

Example 3

100 cc. of water and 1.2 mols=120 g. of Formalin solution (30%) previously brought to a pH of 8 to 9 with soda are added to 0.5 mol=146 g. of hexamethylene-bis - (carbamic acid - β - hydroxyethyl ester) (M.P. 93 to 95° C.). The reaction mixture is heated for 20 minutes at 70° C. and concentrated by evaporation in vacuo and 500 cc. of methanol are added to the residue. The solution is brought to a pH of 2 by the addition of concentrated hydrochloric acid, heated for ½ hour at 40° C. and neutralised with soda and after removal of the methanol by evaporation in vacuo and filtration, 176 g. of a viscous oil=92.5% of theoretical, of the following formula are obtained:

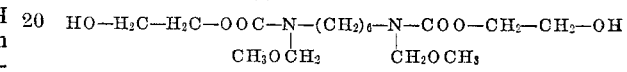

Hexamethylene - bis - (N - methylolmethyl ether - carbamic acid - β - hydroxyethyl ester).

Analysis calculated for $C_{16}H_{32}N_2O_8$: molecular weight 380. Calculated: C, 50.5%; H, 8.4%; O, 33.7%; N, 7.4%. Found: C, 50.0%; H, 8.6%; O, 33.3%; N, 7.7. Molecular weight (determined in methanol) 418.

Example 4

1 mol=264 g. of tetramethylene - bis - (carbamic acid - β - hydroxyethyl ester) (M.P. 94 to 96° C.) are reacted under the conditions of Example 3 with 2.4 mols=240 g. of 30% Formalin solution, dissolved in 1000 cc. of methanol and etherifield as in Example 3. 254 g.~72% of theoretical of a viscous, water-soluble oil of the following formula are obtained:

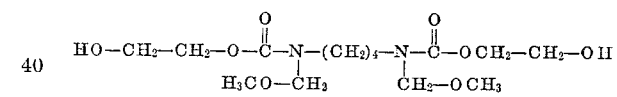

Tetramethylene - bis - (N - methylolmethyl ether - carbamic acid - β - hydroxyethyl ester); [tetramethylene-bis - (N - methylolmethyl ether - β - hydroxyethyl urethane)].

Analysis calculated for $C_{14}H_{28}O_8N_2$: molecular weight 352. Calculated: C, 47.7%; H, 7.95%; O, 36.4%; N, 7.95%. Found: C, 47.1%; H, 8.01%; O, 36.5%; N, 8.3%. Molecular weight (determined in methanol) 387.

Example 5

1 mol=236 g. of ethylene - bis - (carbamic acid-β - hydroxyethyl ester) (M.P. 88° C.) are reacted with 2.4 mols=240 g. of 30% Formalin solution and 1000 cc. of methanol under the conditions of Example 3 to form 243 g.=75% of theoretical of a viscous, water-soluble oil of the following formula:

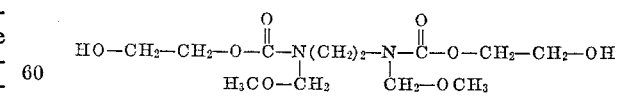

Ethylene - bis - (N - methylolmethylether - carbamic acid- β - hydroxyethyl ester).

Analysis calculated for $C_{12}H_{24}N_2O_8$: molecular weight 324. Calculated: C, 44.5%; H, 7.4%; O, 39.5%; N, 8.65%. Found: C, 44.5%; H, 7.5%; O, 39.1%; N, 9.15%. Molecular weight (determined in methanol) 350.

Example 6

1 mol=208 g. of hydrazo-dicarboxylic acid-β-hydroxyethyl ester obtained from 2 mols of glycol carbonate and 1 mol of hydrazin (C.R. 234, 2374 (1952)), are heated to 70° C. at a pH of 8 to 9 after the addition of 2.2 mols=220 g. of Formalin (30%) and a small amount of sodium carbonate. After 20 minutes, the clear solution is concentrated by evaporation in vacuo and the residue, dissolved in 1000 cc. of methanol, is converted into the methyl ether at a pH of 2. After neutralisation with soda, the reaction mixture is filtered and concentrated by evaporation in vacuo. 185 g.=62.5% of theoretical of a viscous, water-soluble oil of the following formula are obtained:

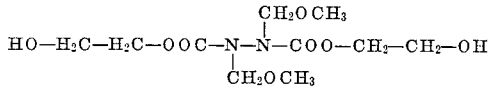

Bis - (N - methylolmethylether - carbamic acid - $\beta$ - hydroxyethyl ester); N,N' - bis - (methylolmethylether)-hydrazodicarboxylic acid-di-$\beta$-hydroxyethyl ester.

Analysis calculated for $C_{10}H_{20}N_2O_8$: molecular weight 296. Calculated: C, 40.6%; H, 6.75%; O, 43.2%; N, 9.46%. Found: C, 40.4%; H, 6.9%; O, 42.6%; N, 9.6%. Molecular weight (determined in methanol) 334.

We claim:
1. A product of the formula

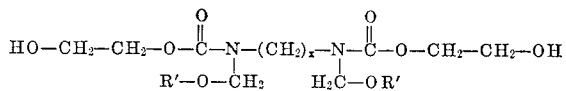

wherein R' is alkyl containing 1 to 12 carbon atoms and $x$ is 0 to 6.

2. The compounds of claim 1 wherein R' is alkyl containing 1 to 4 carbon atoms.
3. The compounds of claim 1 wherein R' is methyl.

References Cited
UNITED STATES PATENTS

| | | | |
|---|---|---|---|
| 2,184,008 | 12/1939 | Dickey et al. | 260—482 XR |
| 2,703,810 | 3/1955 | Viard | 260—482 XR |
| 2,755,286 | 7/1956 | Bell et al. | 260—482 XR |
| 2,928,812 | 3/1960 | Ernst | 260—482 |
| 3,087,965 | 4/1963 | Dowbenko et al. | 260—561 |
| 3,226,428 | 12/1965 | Vial et al. | 260—482 |
| 3,357,932 | 12/1967 | Heydkamp et al. | 260—482 XR |

FOREIGN PATENTS

| | | |
|---|---|---|
| 559,551 | 7/1958 | Canada. |
| 610,393 | 12/1960 | Canada. |
| 1,030,430 | 3/1953 | France. |

LORRAINE A. WEINBERGER, Primary Examiner
ALBERT P. HALLUIN, Assistant Examiner

U.S. Cl. X.R.
8—116; 260—77